(12) United States Patent
Meiwes et al.

(10) Patent No.: US 7,207,322 B2
(45) Date of Patent: Apr. 24, 2007

(54) SUPERCHARGER INSTALLATION WITH LOAD CONTROL FOR INTERNAL COMBUSTION ENGINES

(75) Inventors: Johannes Meiwes, Markgroeningen (DE); Michael Baeuerle, Ditzingen-Heimerdingen (DE); Udo Sieber, Bietigheim (DE); Ralph Engelberg, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/147,917

(22) Filed: Jun. 8, 2005

(65) Prior Publication Data

US 2006/0064979 A1 Mar. 30, 2006

(30) Foreign Application Priority Data

Sep. 29, 2004 (DE) .................. 10 2004 047 180

(51) Int. Cl.
| | |
|---|---|
| F02B 33/00 | (2006.01) |
| F02B 27/00 | (2006.01) |
| F02B 33/36 | (2006.01) |
| F02B 33/44 | (2006.01) |
| F02B 39/12 | (2006.01) |
| F02B 39/04 | (2006.01) |
| F02D 23/02 | (2006.01) |
| F02M 35/10 | (2006.01) |
| F01L 1/34 | (2006.01) |

(52) U.S. Cl. .................. 123/559.1; 123/184.53; 123/90.15; 123/90.17; 251/129.11; 251/297

(58) Field of Classification Search ..... 123/559.1–565, 123/184.53–184.57, 90.15, 90.16, 90.17, 123/90.18; 251/68, 7, 309, 71, 297, 129.11
See application file for complete search history.

(56) References Cited

U.S. PATENT DOCUMENTS

| | | | | |
|---|---|---|---|---|
| 4,592,310 A | * | 6/1986 | Hitomi et al. | 123/184.55 |
| 5,033,268 A | * | 7/1991 | Hitomi et al. | 123/559.1 |
| 5,090,202 A | * | 2/1992 | Hitomi et al. | 123/184.56 |
| 5,113,826 A | * | 5/1992 | Anzai | 123/184.56 |
| 5,226,397 A | * | 7/1993 | Zabeck et al. | 123/516 |
| 5,495,830 A | * | 3/1996 | Wu | 123/90.15 |
| 5,823,157 A | * | 10/1998 | Muramatsu | 123/184.56 |
| 6,079,210 A | * | 6/2000 | Pintauro et al. | 60/602 |
| 6,196,178 B1 | * | 3/2001 | Minegishi et al. | 123/184.56 |
| 6,269,839 B1 | * | 8/2001 | Wickham et al. | 137/625.65 |
| 6,412,459 B1 | * | 7/2002 | Takahashi et al. | 123/90.15 |
| 6,672,565 B2 | * | 1/2004 | Russell | 251/297 |
| 6,953,084 B2 | * | 10/2005 | Greeb et al. | 166/66.4 |
| 2005/0045139 A1 | * | 3/2005 | Fagala | 123/184.56 |
| 2006/0048739 A1 | * | 3/2006 | Isaji et al. | 123/184.56 |

FOREIGN PATENT DOCUMENTS

| | | | | |
|---|---|---|---|---|
| GB | 2239899 A | * | 7/1991 | |
| JP | 60240822 A | * | 11/1985 | |
| JP | 62191627 A | * | 8/1987 | |
| JP | 63143349 A | * | 6/1988 | |

* cited by examiner

*Primary Examiner*—Thia-Ba Trieu
(74) *Attorney, Agent, or Firm*—Baker & Daniels LLP

(57) ABSTRACT

An impulse turbocharger for an internal combustion engine. The impulse turbocharger is adapted to be used for controlling the air flow of an air supply conduit on the intake side of an internal combustion engine. The impulse turbocharger has a rotary valve which is connected by an elastic coupling to a rotary actuator.

19 Claims, 3 Drawing Sheets

SUPERCHARGER INSTALLATION WITH LOAD CONTROL FOR INTERNAL COMBUSTION ENGINES

BACKGROUND OF THE INVENTION

Supercharger installations are one way of improving the filling of cylinders with combustion air in internal combustion engines. Such installations can be implemented as exhaust-gas turbochargers or mechanically driven superchargers or pressure wave superchargers, and they increase the pressure level in the intake tract of an internal combustion engine in order to increase the filling efficiency of the cylinders when the engine's intake valves are open. In the case of exhaust-gas turbochargers, the so-called "turbo hole" occurs when the engine is operating at low speeds, since because of the lower volume flow of exhaust gas, the mechanical power delivered to the compressor impeller of the turbocharger by the turbine wheel is not sufficient to increase the pressure in the intake tract of the engine.

With exhaust-gas turbochargers, which are used on both auto-ignition and external-ignition type engines, the above-mentioned turbo hole occurs in the lower speed range of the engine. When an engine is in this operating mode, the volume flow of the exhaust gas generated by the engine is not sufficient to drive the compressor impeller of the exhaust-gas turbocharger at a rotation speed that can be utilized to increase the pressure adequately in the engine's intake tract.

One way of coping with the above-described characteristic operating feature of exhaust-gas turbochargers is to provide the exhaust-gas turbocharger with booster units—electrically drivable, for example—which can be switched on, for example via an overrunning clutch, when the engine reaches a given lower speed, and can be cut out, for example via an overrunning or overriding clutch or the like, once a given engine speed that prevents turbo hole has been exceeded.

Impulse turbochargers are known from the prior art. They are disposed in the intake tract of an internal combustion engine, on the intake side of the engine. The impulse turbochargers used heretofore operate on the butterfly valve principle, and have a butterfly-valve-like mechanism integrated into the engine's charge air supply system. However, the butterfly valve principle used has the major disadvantage that the stability of the butterfly valves is consistently unsatisfactory, due to the extremely short switching times and the frequent mechanical contact with stop faces. The frequent striking of driven butterfly valves of such impulse turbochargers against the walls of the charge air supply conduit is accompanied by mechanical wear and causes not-insignificant noise generation in the intake tract. In addition, the wear to which the valves of the impulse turbochargers used are subjected with increased engine operating time causes the valves to be no longer completely tight when closed, and an ever-increasing leakage flow of the charge air begins to occur along the no longer tightly closing valves and has a negative impact on the efficiency of an impulse turbocharger of this design in the intake tract of an internal combustion engine.

If the impulse turbocharger used in the intake tract of an internal combustion engine is configured as a rotary slide valve (for example in the form of a transversely drilled cylinder), the design volume of the impulse turbocharger has to be relatively large in order to cover the entire opening cross section of the charge air supply conduit. In addition to the large spatial requirements of impulse turbochargers configured in this manner, they also have the disadvantage of large moving masses, causing their use to place heavy demands on the drive and elicit high mass moments of inertia. Short switching times are difficult to achieve with impulse turbochargers implemented as rotary slide valves.

With auto-ignition engines and any type of engine that has an exhaust-gas return valve, there is a further exacerbating disadvantage in the form of a deposit problem caused by the exhaust-gas return valve. Coatings of tar several millimeters thick must be kept under control throughout the portion of the intake manifold impinged on by the exhaust gas. An increase in mass caused by the layers of tar deposited on the side walls of that portion of the intake manifold results in major problems with switching times. In addition, the butterfly valves of an impulse turbocharger operating on the butterfly valve principle may stick, ultimately causing the supercharger unit to fail. Throttle devices are usually installed in the intake tract to achieve load control and filling control in the engine's part-load range.

SUMMARY OF THE INVENTION

It is proposed according to the invention to implement an impulse turbocharger in the intake tract of an internal combustion engine by means of a rotary slide valve that can be driven via an electrically actuatable impulse coupling by means of a rotary actuator constructed, for example, as an electric motor.

The advantages that accompany this solution include the fact that the inventively proposed solution is relatively insensitive to deposits. The working surfaces, that is, the inner circumferential surface of a housing enclosing the rotary valve, form a sliding bearing surface for the casing surface of the rotary slide valve. The rotary slide valve is thereby supported according to the sliding bearing principle inside the housing that encloses it. Self-cleaning of the surfaces can be achieved in this way, thus making them insensitive to deposits.

The inventively proposed implementation of an impulse turbocharger further has a very fast switching behavior due to an electrically supplied impulse coupling, thus eliminating the need for a throttle device, since the throttle function can be assumed by the impulse turbocharger implemented as a rotary slide valve. In comparison to a throttle device, the inventively proposed impulse turbocharger located in the intake tract of an engine permits optimum filling control for the cylinders concerned, with higher filling dynamics.

A further advantage is that, in contrast to impulse turbochargers operating according to the butterfly valve principle, with the inventively proposed solution there is none of the mechanical stopping against sealing surfaces that is necessarily associated with severe wear. Instead, the function of mechanical stopping is decoupled from the sealing function via an electrically actuatable pawl. In the inventively proposed solution, the sealing function is provided by the fact that the proposed impulse turbocharger comprises a cylinder disposed in a housing that surrounds it and also surrounds the relevant portion of the intake manifold in the intake tract of the engine.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
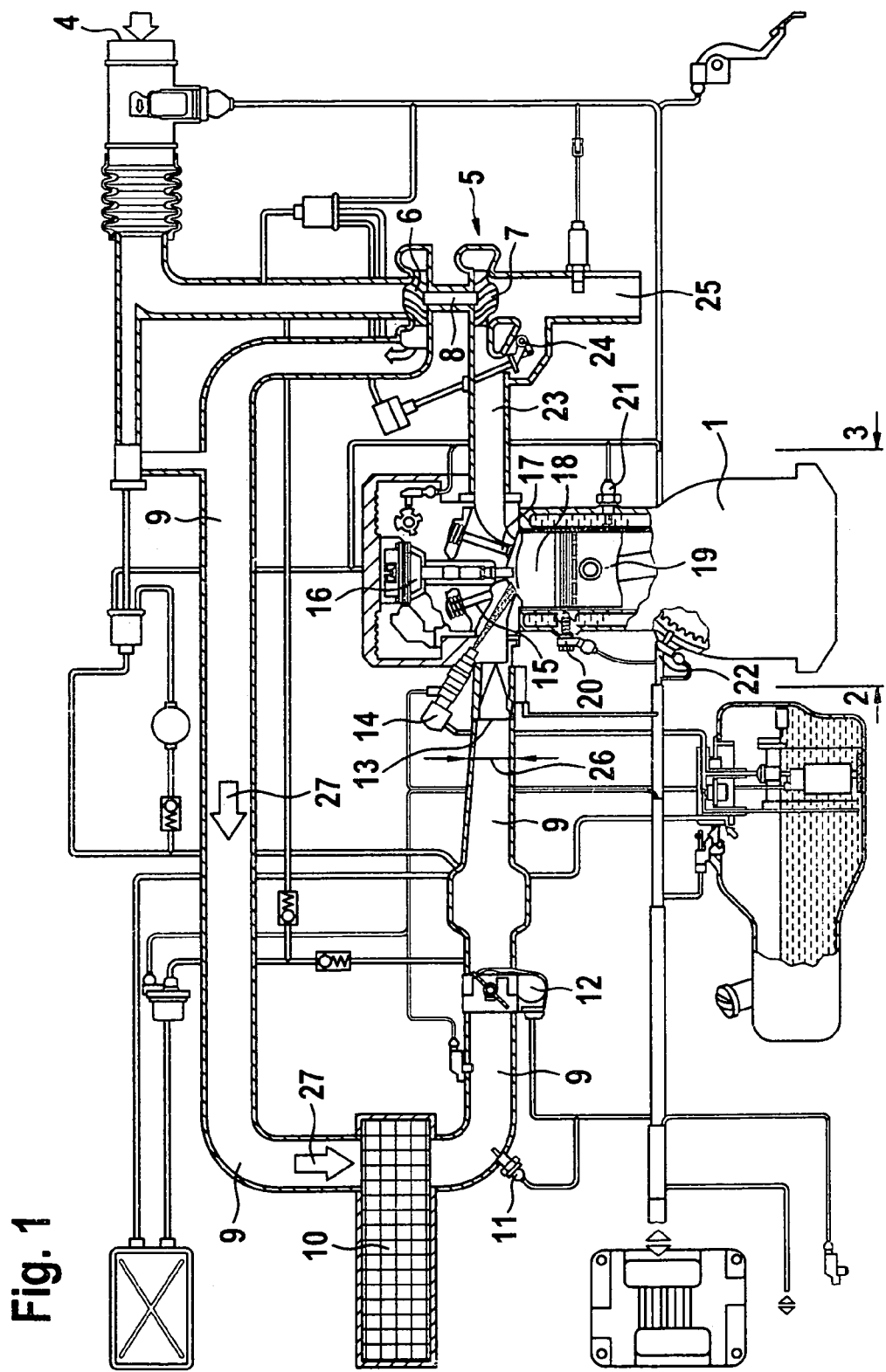
FIG. 1 shows the components of an internal combustion engine, with an impulse turbocharger operating on the butterfly valve principle disposed in the intake tract.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DESCRIPTION OF THE PRESENT INVENTION

In the representation according to FIG. 1, an external-ignition engine, as the internal combustion engine 1, is illustrated inclusive of its intake-tract and exhaust-tract components. The combustion air needed for combustion in the combustion chamber is supplied to engine 1 via an air intake 4, to which an air mass meter (not shown) and an air filter element (not shown) can be assigned. The combustion air flows to an air supply conduit 9 and in so doing can pass through a compressor part 6 of a supercharger installation 5 optionally assigned to the engine. Supercharger installation 5 includes the aforesaid compressor part 6 plus a turbine part 7. Compressor part 6 and turbine part 7 are interconnected via a shaft 8. The optionally precompressed combustion air flows to air supply conduit 9 and passes through an intercooler 10, which can be followed by a charge air sensor 11. The combustion air flowing into air supply conduit 9 is symbolized by the arrow labeled with reference numeral 27. After passing charge air sensor 11, the combustion air 27 flows through a throttle device 12 to an impulse turbocharger 13. Impulse turbocharger 13 is disposed immediately before the intake side 2 of engine 1 and, in the embodiment variant shown, is designed on the butterfly valve principle.

The internal combustion engine, which can be a three-, four-, five-, six-, eight-, ten- or twelve-cylinder engine, includes a number of intake valves 15 equal to the number of cylinders. The engine 1 illustrated by way of example in FIG. 1 further comprises ignition devices 16 assigned to the individual cylinders according to the number of cylinders.

Provided on the exhaust side 3 of engine 1 are exhaust valves 17 equal in number to the number of cylinders. The exhaust gas flows through the exhaust valves 17 to an exhaust gas passage 23 and impinges on the turbine part 7, disposed therein, of supercharger installation 5. A waste gate 24 can optionally be built into exhaust gas passage 23 and operates to vary the stream of exhaust gas flowing to an exhaust pipe 25.

Directly behind impulse turbocharger 13 is a fuel injector 14 through which fuel can be injected into a combustion chamber 18 when intake valve 15 is open. Inside combustion chamber 18, with intake valve 15 and exhaust valve 17 closed, the mixture compressed by the upward movement of the piston 19 is ignited and made to explode.

For the sake of completeness, it should be noted that the internal combustion engine 1 has assigned to it at least a knock sensor 20, a temperature sensor 21 for registering the coolant temperature, and, in the region of the crankshaft flywheel, an rpm sensor 22.

Figure 2:
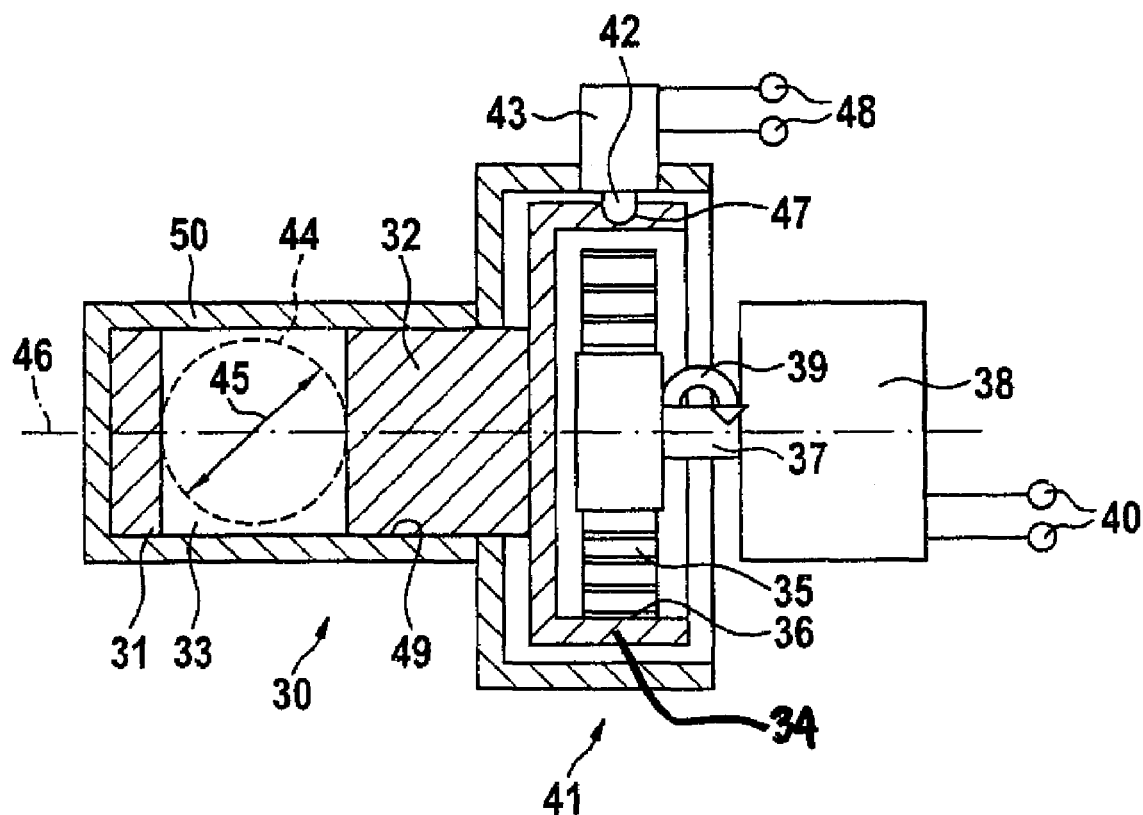
FIG. 2 shows an embodiment of an impulse turbocharger according to the instant invention.

The representation according to FIG. 2 teaches an embodiment of an inventively proposed impulse turbocharger. The impulse turbocharger illustrated in FIG. 2 is implemented as a rotary valve 30. Rotary or torsion valve 30 comprises a cylindrically constructed housing 31 that encloses an intake-manifold portion of an intake manifold 44. Accommodated in cylindrically constructed housing 31 is a rotatable cylinder part or rotary slide valve 32 containing a through-opening 33, which can be formed as a bore, for example. The cross section of through-opening 33 is equal to the free flow cross section 45 of intake manifold 44, indicated in FIG. 2 by the dashed circular line. Cylinder 32 of rotary valve 30 rests on an inner circumferential surface 50 of housing 31, and the casing surface of the rotary slide valve implementable as a cylinder 32 is therefore supported by housing 31 according to the sliding bearing principle. This achieves the effect of self-cleaning of the working surfaces, i.e., the inner circumferential surface 50 of housing 31 and the casing surface of the rotary slide valve implementable as a cylinder 32.

Disposed on cylinder 32 is a first bellhousing 34 surrounded by a wider-diameter region of housing 31. First bellhousing 34, which is rotationally fixedly connected to cylinder 32, contains a first torsion spring 35, implemented for example as a spiral spring. First torsion spring 35 is connected at one end to first bellhousing 34 at a bearing location 36; at the other end, first torsion spring 35 is connected via a further bearing location to a transmission element that is rotationally fixedly connected to a shaft 37 of a rotary actuator 38. Rotary actuator 38, which can be implemented as an electric motor, for example, is connected via connection terminals 40 to an on-board electrical system of a motor vehicle. Rotary actuator 38, which actuates cylinder 32 of rotary valve 30, elastic first torsion spring 35 being interposed between them, is driven synchronously with the rotation of the camshaft of the engine.

In the embodiment of an impulse turbocharger 13 depicted in FIG. 2, the latter comprises an impulse coupling 41, first bellhousing 34, first torsion spring 35 enclosed thereby, and, received in the broadened portion of housing 31, an actuator 43. The latter can be implemented as a magnet, for example, and is connected via actuator terminals 48 to the vehicle's on-board electrical system. Actuator 43 operates a first pawl 42, which engages a detent opening 47 on the outer circumference of first bellhousing 34.

Cylinder 32 of torsion valve 30 is constructed symmetrically to line 46 of symmetry, as is first bellhousing 34, which is rotationally fixedly connected to the rotary slide valve implementable as a cylinder 32.

The embodiment of rotary valve 30 illustrated in FIG. 2, which is implemented as a rotary slide valve, is disposed at the same mounting location as the impulse turbocharger 13 operating on the butterfly valve principle used in the intake tract of an internal combustion engine heretofore, as depicted in FIG. 1. The gas exchange at each intake valve 15 can be controlled by means of rotary valve 30. Very short opening times are achieved with by means of the above-described impulse coupling 41, which is preloaded by rotary actuator 38 via first torsion spring 35 immediately before each opening operation of rotary valve 30. By means of actuator 43, which can be constructed for example as an electromagnet, impulse coupling 41 can be triggered at a variable time that can be set by the engine control system, so that rotary valve 30 and cylinder 32 enclosed by housing 31 and provided with a through-opening 33 respectively receive an acceleration pulse and thus open very rapidly.

In terms of the choice of material, if cylinder 32 of rotary valve 30 is made for example of synthetic material, the minimized mass moments of inertia obtained can greatly enhance the switching behavior.

To prevent pendulum motions of the actuated spring-mass system represented by cylinder 32, first rotary spring 35 and first bellhousing 34, the first pawl 42, which can be actuated via actuator 43, is actuated again after the opening operation has been completed. This preferably occurs at the first reversal point.

This detent position, i.e., the excursion of cylinder 32 into a position in which the cross section 45 of the intake manifold is aligned with the cross section of through-opening 33 in cylinder 32 and the entire flow cross section thus is uncovered, is cancelled to initiate the closing operation by the re-triggering of actuator 43. Thus, when actuator 43 is re-triggered, first pawl 42 moves out of detent opening 47 formed in the circumferential surface of first bellhousing 34.

In supercharge mode (impulse turbocharging), the instant at which actuator 43 triggers opening is selected so that impulse coupling 41 releases considerably after the instant at which intake valve 15 opens (EO), whereas in the part-load range of the engine the instant at which opening is triggered is very early, and is therefore, for example, considerably before the instant at which intake valve 15 opens. Thus, closure of the rotary slide valve implementable as cylinder 32 occurs well before the instant at which intake valve 15 closes (ES). The different triggering instants at which impulse coupling 41 releases make it possible to adjust in ideal fashion both to the operating conditions that prevail when the engine is in full-load operation and to those that prevail when it is in part-load operation. For example, in the part-load range, where the instant of triggering the opening of rotary slide valve implemented as cylinder 32, i.e., that of rotary valve 30, occurs very early, before "intake valve opens," the effect is achieved of throttling or reducing the filling of the corresponding cylinder of the engine. A load control behavior that is optimized for throttling losses can be obtained in this way. Moreover, the fact that the inventively proposed impulse turbocharger has an inherent throttling action when the engine is in part-load operation and can be used to reduce the filling of the engine's cylinders eliminates the need for a throttling device that otherwise would have to be provided in air supply conduit 9.

Internal combustion engines, whether external-ignition or auto-ignition, usually have more than one cylinder. The respective cylinders of the engine are supplied with the combustion air needed for combustion by suction pipes branching off from the air supply conduit 9. According to the inventively proposed solution, this circumstance can be taken into account by extending cylinder 32 of rotary valve 30 and thus enabling plural cylinders of the engine to be served in terms of air supply (cf. the embodiment variant of FIG. 3). The control times, i.e., the opening and closing of the respective intake cross sections 45 in intake manifold 44, which supplies the cylinder concerned with combustion air, should be selected on the basis of the angular positions of the through-openings 33 corresponding to the timing of the engine's cylinders.

In a further embodiment variant of the proposed impulse turbocharger, two dual units disposed in a mirror-image arrangement with respect to each other can be implemented in four-, six-, ten- or even twelve-cylinder engines.

Finally, it is also possible to configure a rotary valve 30 so that it comprises an opening slide valve and a closing slide valve. Similar drive units, each comprising a rotary actuator 38, can be disposed on either side of intake manifold 44, with the two portions of the rotary slide valve that respectively release and occlude the cross section 45 of the intake manifold engaging each other coaxially and able to be driven in opposite directions of rotation with respect to each other (cf. FIG. 4).

The impulse coupling 41 illustrated in FIG. 2 could also be designed as a dual impulse coupling if a further, additional detent opening 47 is formed in the outer circumferential surface of first bellhousing 34 rotationally fixedly connected to cylinder 32 of rotary valve 30. The additional detent position on first bellhousing 34 serves to keep a cylinder 32 in the open position, resulting in a very rapid closing operation.

Figure 3:
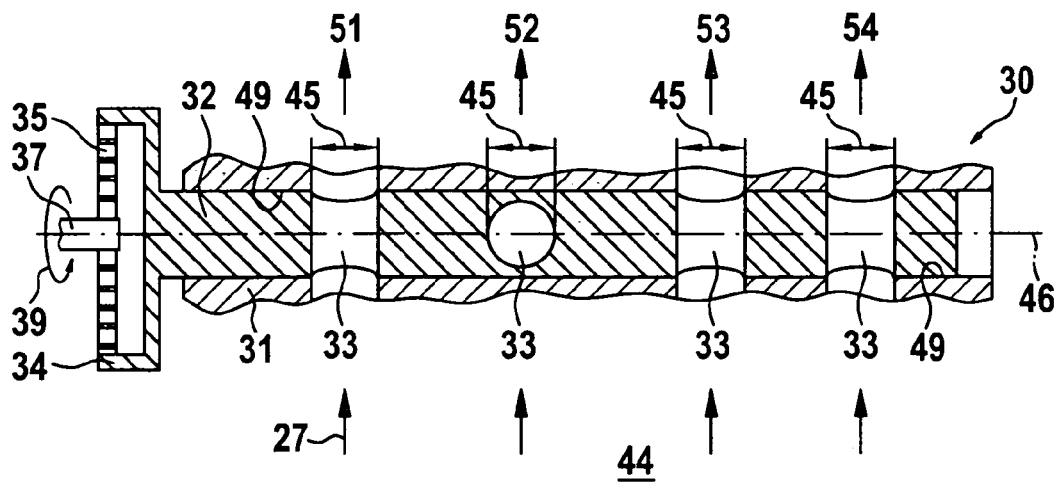
FIG. 3 shows an extended embodiment of the impulse turbocharger of FIG. 2.

FIG. 3 shows an extended embodiment variant of the impulse turbocharger.

In the embodiment variant of the inventively proposed impulse turbocharger in the form of a rotary slide valve illustrated in FIG. 3, cylinder 32 is implemented as an elongated cylinder with through-openings 33. In the simplest case, said through-openings 33 can be in the form of bores. A number of through-openings 33 that corresponds to the number of cylinders in a multi-cylinder internal combustion engine is formed in cylinder 32 of rotary valve 30. Cylinder 32 of rotary valve 30 is disposed in housing 31, the casing surface of cylinder 32 being rotatably supported, in the manner of a sliding bearing, by inner circumferential surfaces 50 of housing 31. The bearing locations of cylinder 32 in housing 31 are indicated by reference numeral 49.

Disposed on extendedly implemented cylinder 32 is first bellhousing 34, which is coupled to shaft 37 via first torsion spring 35, said first torsion spring 35 optionally being implemented as a spiral spring.

From the illustration of FIG. 3 it can be inferred that the stream 27 of air flows through intake manifold 44. Downstream of rotary valve 30, intake cross sections 45 can be impinged upon via through-openings 33. The intake cross sections 45 implemented to correspond to the number of cylinders in the multi-cylinder engine 1 supply intake air to, for example, a first cylinder 51, a second cylinder 52, a third cylinder 53 and a fourth cylinder 54 of a four-cylinder engine. The through-openings 33 in the extendedly implemented cylinder 32 of rotary valve 30 are implemented with an angular offset relative to one another that corresponds to the opening positions of the intake valves 14 of the engine 1. The angular offset is so selected that impulse turbocharger 13 implemented as a rotary slide valve according to the proposed solution ensures optimum filling of cylinders 51, 52, 53 and 54, respectively, in the engine's full-load range and allows filling to be reduced and brings about a throttling action in the engine's part-load range. Also in the representation of FIG. 3, cylinder 32 of rotary valve 30 is supported in housing 31 according to the sliding bearing principle. The casing surface of the extendedly implemented cylinder 32 is surrounded by corresponding sliding-bearing surfaces of housing 31. This embodiment variant provides the advantage of producing a self-cleaning effect and enabling cylinder 32 of rotary valve 30 to be consistently smoothly operable in housing 31. This smooth operation is especially important for the life of the rotary slide valve 34 driving the cylinder 32 of rotary valve 30.

Figure 4:
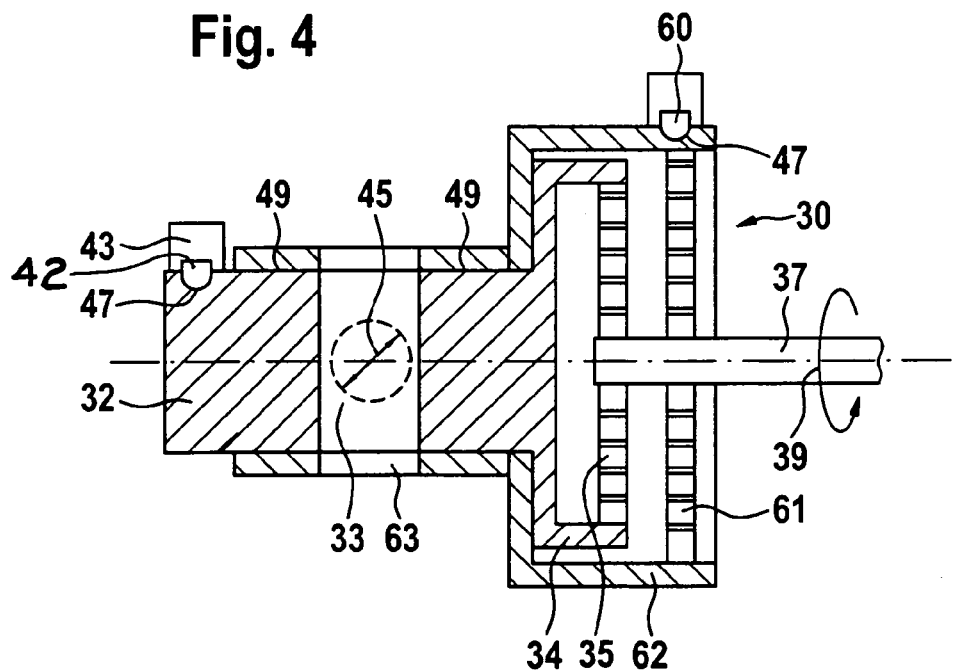
FIG. 4 shows an alternate embodiment of an impulse turbocharger with a coaxial rotary slide valve.

A coaxial design for the rotary slide valve of the inventively proposed impulse turbocharger can be inferred from the representation of FIG. 4.

It can be seen from the representation of FIG. 4 that rotary valve 30 embraces cylinder 32, on which first bellhousing 34 is formed. In this embodiment variant of the inventively proposed impulse turbocharger, cylinder 32, together with its first bellhousing 34, is enclosed by an additional bellhousing 62 comprising a tubular projection that surrounds the cylinder 32 of rotary valve 30. Assigned to cylinder 32 of rotary valve 30 is first pawl 42, which cooperates with detent opening 47 formed in the circumferential surface of cylinder 32. Assigned to the additional bellhousing 62 is a second pawl 60, which can be actuated electrically, for example. This cooperates with a detent opening 47 formed in the circumferential surface of second bellhousing 62. Cylinder 32 comprises through-openings 33, illustrated in FIGS. 2 and 3, which correspond to through-openings 63 in the tubular projection of additional bellhousing 62. The intake cross section is denoted by reference numeral 45 (cf. representation of FIG. 3).

First bellhousing 34 is connected to shaft 37 via first torsion spring 35, which can be implemented for example as a spiral spring; while additional bellhousing 62, to which second pawl 60 is assigned, is connected to shaft 37 via an additional torsion spring 61. Shaft 37, for its part, can be operated via the rotary actuator 38 depicted in the implementation variant of FIG. 2.

In the implementation variant of the inventively proposed impulse turbocharger as a coaxial rotary slide valve illustrated in FIG. 4, one of the rotary slide valves—thus, for example, cylinder 32 with first bellhousing 34—functions as an opening slide valve, whereas the rotary slide valve enclosing it and comprising the tubular projection and the additional bellhousing 62 can function, for example, as a closing slide valve. Separate rotary actuators 38 can be assigned respectively to the additional bellhousing 62 and to first bellhousing 34 plus cylinder 32, in which case opposite directions of rotation can be achieved for rotary slide valves 32, 34 and 62 disposed coaxially one inside the other.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. An intake air control system for use with an internal combustion engine, said system adapted to be operatively connected to an intake side of the engine to control the flow of air from an air supply conduit to the engine, said system comprising:
   a rotary valve rotatable to selectively allow and restrict a flow of air through the air supply conduit to the engine, said rotary valve comprising a cylinder with a bell-shaped region, said bell-shaped region including a detent;
   a rotary actuator; and
   an impulse coupling including a spring member resiliently drivingly coupling said rotary actuator to said rotary valve, said impulse coupling further including a second actuator which is operatively engageable with said detent, whereby said spring member is operable to selectively transmit rotational torque from said rotary actuator to said rotary valve.

2. The system of claim 1 whereby said rotary actuator is adapted to be connected to a camshaft of the engine, the camshaft controlling intake and exhaust valves of the engine.

3. The system of claim 1 wherein said rotary valve comprises a said rotary actuator comprises a shaft, and said torsion spring having two ends, one said end rotationally fixedly secured to said shaft and the other said end rotationally fixedly secured to said cylinder.

4. The system of claim 3 wherein said torsion spring is a coil spring.

5. The system of claim 1 wherein said rotary valve has a through hole therein, said through hole having a cross sectional area of substantially equal size as the cross sectional area of the air supply conduit.

6. The system of claim 5 wherein said rotary valve includes a plurality of through holes equal in number to the number of cylinders of the engine.

7. The system of claim 1 wherein said rotary valve further comprises a housing with an inner surface, said cylinder disposed in said housing in contact with said inner surface.

8. The system of claim 1 wherein said cylinder and said bell-shaped portion are made of a synthetic material.

9. The system of claim 1 wherein said rotary valve comprises a coaxial sliding valve having a first bell-shaped portion and a second bell-shaped portion coaxially arranged with and surrounding said first bell-shaped portion and defining a tubular projection enclosing said cylinder.

10. The system of claim 9 wherein said first and said second bell-shaped portions are rotatable in opposite directions relative to each other, each said bell-shaped portions having a pawl operatively associated therewith to arrest the rotation of its associated bell-shaped portion.

11. An intake air control system for use with an internal combustion engine, said system adapted to be operatively connected to an intake side of the engine to control the flow of air from an air supply conduit to the engine, said system comprising:
   a rotary valve rotatable to selectively allow and restrict a flow of air through the air supply conduit to the engine;
   a first actuator;
   an impulse coupling resiliently connecting said first actuator to said rotary valve, said impulse coupling including an energy storage member movable by said first actuator between a relaxed position and a tensioned position; and
   a second actuator movable between a first position in which said second actuator engages and rotatably retains said rotary valve and a second position in which said second actuator is disengaged from said rotary valve, wherein when said energy storage member of said impulse coupling is in said tensioned position, movement of said second actuator from said first position to said second position releases said rotary valve for rotation by said energy storage member.

12. The system of claim 11 whereby said first actuator is adapted to be connected to a camshaft of the engine, the camshaft controlling intake and exhaust valves of the engine.

13. The system of claim 11 wherein said rotary valve comprises a cylinder, said first actuator comprises a shaft, and said energy storage member of said impulse coupling comprises a torsion spring having two ends, one said end secured to said shaft and the other said end secured to said cylinder.

14. The system of claim 11 wherein said rotary valve comprises a cylinder having a through hole therein, said through hole having a cross sectional area of substantially equal size as the cross sectional area of said air supply conduit.

15. The system of claim 11 wherein said rotary valve comprises a housing with an inner surface, and a cylinder disposed in said housing in contact with said inner surface.

16. The system of claim 11 wherein said rotary valve includes a plurality of through holes equal in number to the number of cylinders of the engine.

17. The system of claim 11 wherein said rotary valve comprises a coaxial sliding valve having a cylinder, a first portion, a second portion coaxially arranged with and surrounding said first portion and defining a tubular projection enclosing said cylinder, said first and said second portions rotatable in opposite directions relative to each other, each of said first and second portions having a pawl operatively associated therewith to arrest the rotation thereof.

18. An intake air control system for use with an internal combustion engine, said system adapted to be operatively connected to an intake side of the engine to control the flow of air from an air supply conduit to the engine, said system comprising:

a rotary valve comprising a cylinder, said cylinder rotatable to selectively allow and restrict a flow of air through the air supply conduit to the engine;

a first actuator comprising a rotatable shaft; and an impulse coupling including a torsion spring drivingly coupling said rotatable shaft to said rotary valve, said torsion spring having two ends which are respectively rotationally fixedly secured to said shaft and said cylinder and thereby coupling said shaft to said cylinder, said torsion spring having a preloaded tensioned position and a relaxed position, said impulse coupling further including a second actuator, said second actuator adapted to selectively permit said torsion spring to return from said preloaded position to said relaxed position, said rotary operator preloading said torsion spring immediately prior to the opening of said rotary valve.

19. The system of claim 18 wherein said rotary valve including a bell-shaped region, said bell-shaped region including a detent, said second actuator comprising a pawl operatively associated with said detent, whereby, upon the completion of said opening of said rotary valve, said rotary valve is operated to close and interrupt the flow of air, and said pawl engages said detent.

* * * * *